Figure 1:
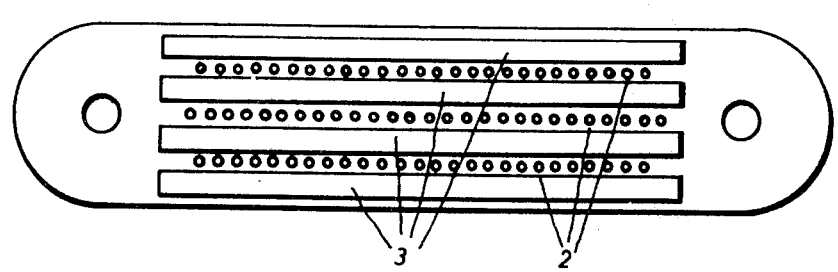

United States Patent [19]

Wilhelm et al.

[11] 4,124,666

[45] Nov. 7, 1978

[54] METHOD OF KEEPING NOZZLE BODIES OR BREAKER PLATES CLEAN DURING EXTRUSION OF POLYMER MELTS

[75] Inventors: Gerd Wilhelm, Neuss; Artur Jäschke, Cologne; Hans-Jürgen Simon, Dormagen; Jens Schmidt, Neuss; Surinder S. Sandhu, Dormagen, all of Germany

[73] Assignee: Bayer Aktiengesellschaft, Leverkusen, Germany

[21] Appl. No.: 811,314

[22] Filed: Jun. 29, 1977

[30] Foreign Application Priority Data

Jul. 3, 1976 [DE] Fed. Rep. of Germany ....... 2630055

[51] Int. Cl.² .............................................. D01D 1/10
[52] U.S. Cl. ...................................... 264/39; 264/169; 264/176 F
[58] Field of Search .................... 264/176 F, 169, 39

[56] References Cited

U.S. PATENT DOCUMENTS

| 3,436,789 | 4/1969 | Hays | 264/39 |
| 3,462,522 | 8/1969 | Clark et al. | 264/39 |
| 3,502,757 | 3/1970 | Spencer | 264/39 |
| 3,814,559 | 6/1974 | Akers et al. | 264/176 Z |
| 3,907,957 | 9/1975 | Shaffer | 264/176 Z |
| 3,975,475 | 8/1976 | Zoley | 264/39 |

FOREIGN PATENT DOCUMENTS 901,398 5/1960 United Kingdom ..................... 264/169

*Primary Examiner*—Jay H. Woo
*Attorney, Agent, or Firm*—Plumley and Tyner

[57] ABSTRACT

The invention relates to a method of keeping nozzle bodies or breaker plates clean during extrusion of polymer which can be shaped from the melt which comprises preventing the formation of deposits near the nozzle orifices by gassing these orifices at the point of extrusion of the melt, said gas consisting entirely or partly of vapors of substances which have a depolymerizing action on the deposits formed from the melt at the edge of the nozzle orifice.

11 Claims, 4 Drawing Figures

METHOD OF KEEPING NOZZLE BODIES OR BREAKER PLATES CLEAN DURING EXTRUSION OF POLYMER MELTS

This invention relates to a method of extruding a polymer melt through a nozzle orifice.

It is known that when polymer melts are extruded through nozzle, deposits form at the edges of the orifices. These deposits are formed from the extruded melt and are capable of reacting with atmospheric oxygen. They form solid crusts along the whole edge of the orifice and interfere with the process of extrusion and/or impair the quality of the extruded product when portions of the crust are detached in the course of time.

In melt spinning processes for the manufacture of fibres and filaments, the crusts of solidified melt deflect the filament of molten substance as it is extruded from the nozzle and regularly interfere with the spinning process.

Crusts are similarly formed at the edge of an extrusion nozzle used for extruding strands of molten material which are subsequently made up into granulates. If the crusts have a certain geometrical formation, melt is deflected from the extruded strand to the body of the nozzle, where it forms into drops which if sufficiently large are detached from the nozzle body and enter the granulate. Such solidified drops of melt have been damaged by their prolonged stay on the underside of the nozzle body and impair the quality of high quality polymer granulates.

Nozzles used for extruding sheets of molten polymer are also liable to become encrusted along their edges with beads of solidified melt which are released into the material of the polymer sheet from time to time and give rise to inhomogeneities in the sheet product.

As a general rule, the problem of contamination of the polymer product with deposits or beads which have become detached from the edge of the orifice of the outlet is particularly serious in polymer products which have a high surface to volume ratio such as strands, wires, filaments and sheets because in products of this kind impurities very easily give rise to visible faults which reduce the quality of the product.

Two different methods are known, among others, for preventing or attenuating these undesirable effects. The formation of encrustations or beads is influenced by the form of the edge of the orifice, both its geometrical form and its surface character. This is the reason why attempts have been made to solve the problem by given a particular geometrical form and/or surface character to the end of the die at the outlet of the melt, for example according to the proposals described in U.S. Pat. Nos. 3,456,292 and 3,608,040, German Patent Specification No. 1,710,621 and French Patent Specification No. 1,299,629. The second method, which is relevant in connection with the present invention, consists of gassing the nozzles or hole type nozzle plates with inert gases such as nitrogen and steam at the outlet side of the melt. This method is mainly intended to ensure that the residues of melt accumulating at the orifice do not oxidize to a hard deposit. This method of gassing with inert gas is described in U.S. Pat. No. 3,229,330 and in German Offenlegungsschrift No. 2,353,824. This method of gassing nozzle plates to some extent prevents damage by oxygen to deposits of melt formed near the outlet aperture of the melt on the nozzle body. Experience has shown, however, that residues of melt left on the lip of the orifice for any length of time undergo structural alterations even if they have not been oxidized. When portions of such deposits become detached, they are liable to form visible, undesirable inclusions in the finished product. It has also been found that as with the method of gassing with inert gas, choosing a suitable geometric form for the end of the nozzle at the outlet side of the melt does not in itself prevent the formation of deposits on the lips of the nozzle but at best attenuates it.

In view of what has been said above, there is a need to develop a process and/or an apparatus by means of which deposits of melt can be removed from the edges of nozzle orifices without interruption of the extrusion process. It is an object of the present invention to develop a method by means of which deposits of melt can be removed from the edges of die orifices without interruption of the extrusion process.

This object is accomplished by a method of keeping nozzle bodies or breaker plates clean during extrusion of polymer which can be shaped from the melt which comprises preventing the formation of deposits near the nozzle orifices by gassing these orifices at the point of extrusion of the melt, said gas consisting entirely or partly of vapours of substances which have a depolymerising action on the deposits formed from the melt at the edge of the nozzle orifice.

To carry out the invention in practice, the condition of the gas and/or vapour, in particular its composition and temperature, and the condition of the extruded melt, particularly its extrusion velocity and temperature, must generally be adjusted to each other so that the depolymerising effect on the extruded product will be extremely slight but residues formed from the melt will be depolymerised by prolonged action of the gas to be converted into degradation products which will generally evaporate and be carried away with vapour/gas mixture and/or vapour condensate. Moreover, the extruded melt which is being formed into strands, fibres or sheets should preferably be washed with vapour or gas on all sides at the mouth of the nozzle orifice. This is advantageously arranged by emitting the vapour or gas from the orifice in the same direction as the melt. The direction and velocity of the stream of vapour/gas should be adjusted so that the form of the extruded melt, for example as a strand, filament or foil, will not be deleteriously affected compared with a product which has not been gassed.

The preferred range of vapour or gas temperatures is given in the Examples.

The polymer melts to which the invention is applicable are mainly polymer condensation and addition products which are capable of forming strands, fibres or sheets, such as polyamides, polycarbonates, polyesters and polyurethanes and their copolymers. The depolymerising action on the above mentioned deposits formed on the edges of the nozzle orifices of the melt when such polymer melts are extruded is obtained from compounds which are reactive in the gaseous or liquid form. In this respect, the present invention differs fundamentally from those in which a protective gas is used to produce an "inert" atmosphere at the die orifice, for example as described in U.S. Pat. No. 3,229,330 or in German Offenlegungsschrift No. 2,353,824. Among the most important substances which have a depolymerising action in the vapour or liquid form is water. Other substances having a similar effect include for example alcohols and amines.

Figure 2:
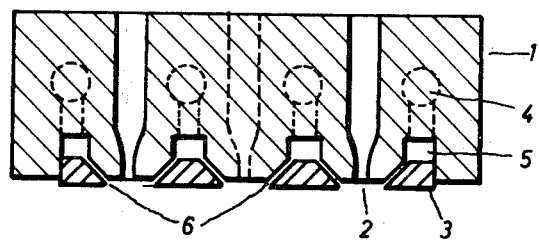

The technical realisation of the invention in the case of spinning nozzles for filament yarns is illustrated in FIG. 1 which represents the undersurface of a body with nozzles 1 with three rows of nozzle orifeces 2. Vapour channels are arranged both between the three rows of apertures and on the outside of these rows. The channels are covered by bars 3. One possible method of gassing the extruded filaments is shown in FIG. 2 which represents a section through such a body of nozzles 1. The steam channels 5 which are supplied with vapour at some suitable point 4 conduct the vapour evenly distributed through slits 6 to the melt extruded from the orifices of the nozzles 2 so that the filaments are surrounded by the vapour on all sides near the body 1. The current of vapour can be adjusted by means of the bars 3 which can be displaced to adjust the width of the slits 6.

Figure 3:
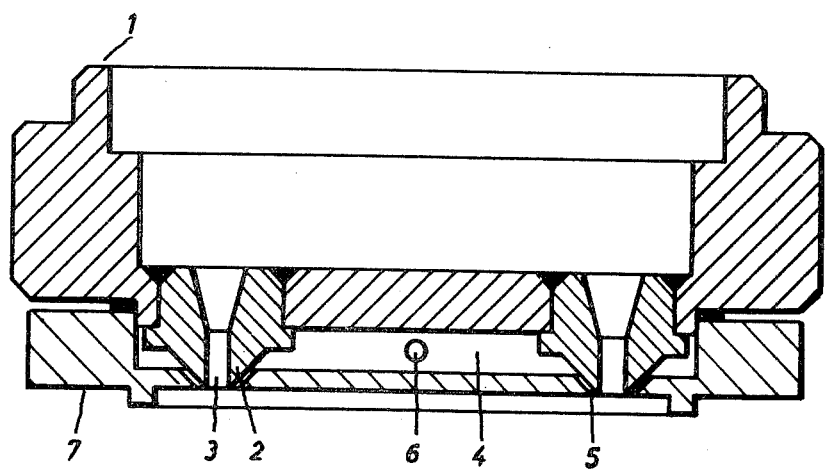

FIG. 3 illustrates the application of the invention to the extrusion of melts from nozzle orifices to form strands. Concentric inserts 2 are rigidly fixed to the die body 1. The melt extruded as strands from apertures 3 is washed on all sides with vapour which is emitted from the vapour chamber 4 above the external cone of the insert 2 through annular gaps 5. The vapour chamber 4, which has a supply inlet 6, is closed off from the atmosphere by a plate 7.

The application of the process according to the invention of gassing with reactive substances to the extrusion of melts of polymer condensation or addition products from slot nozzle to form sheets is comparable to its application to the production of strands and filament yarns. In general, however, it should be noted that the application of the process according to the invention is not closely linked to any particular form of nozzles.

The advantage of employing the process according to the invention lies in the reduced amount of servicing required for the nozzles or hole type plates used for the extrusion of polymer melts of condensation and addition products. Extrusion nozzles which are not gassed require frequent cleaning of the orifices, depending on the form of the nozzle and the nature of the extrudate. Deposits on the nozzle orifices or on the lips of the nozzles deflect melt from the extruded polymer to the undersurface of the nozzle plate and interfere with the extrusion process. In the case of spinning nozzles for filament yarns, it may even be necessary to interrupt the spinning process to remove deposits formed from the melt at the edge of the nozzle orifice, in most cases by mechanical means. If the nozzles are gassed with vapours of reactive substances, these mechanical cleaning operations are unnecessary. Interruptions of the extrusion process therefore also become unnecessary and hence the yield of extruded polymer melt is substantially increased. Apart from the economical advantages of longer continuous service period of the nozzle plates and higher yields of the polymer melts, the qualitative improvement in the extruded polymer is in some cases the most decisive advantage of the process according to the invention. If, for example, accumulations of product at the edge of a orifice which is not gassed become detached and enter the granulate of a high quality spinning material, they frequently cause thread breakages and inhomogeneities in the end product. These defects are obviated by applying the process according to the invention since it improves the quality of the granulate.

As already mentioned above, the device of gassing nozzle plates on the outlet side of the melt with inert gases is already known. Nitrogen and water vapour are used as a protective gas to prevent oxidation. If, according to such a process, a protective gas atmosphere is produced on the nozzle plate around the extruded melt, it is found, as is to be expected, that deposits from the melt seated at the mouth of the orifice cannot be removed by this process of gassing. It has now surprisingly been found that these deposits in the vicinity of the nozzle orifices become reduced in size, lose their contact with the melt extruded from the orifice and can finally be removed if a suitable gassing medium in a reactive state is brought into contact with the deposits in a suitable manner. This surprising effect was observed when extruding polyamide, where it was found that when the edges of the nozzle orifices were gassed with highly superheated steam, the deposits in the form of beads or droplets on the lips of the nozzles shrunk. This observation is obviously related to the fact that under the conditions employed, the steam was not inert but so reactive that the deposits of melt at the orifice of the nozzle were depolymerised within a period of time measured in hours while the melt forming the finished product was not affected by this degradation process. This solution to the given problem differs distinctly from other proposals which seek to provide an atmosphere of protective gas around the outlet of the melt on the nozzle plate by means of inert gases. Information on the efficiency of the process is provided by quantitative experiments carried out with Polyamide-6.

EXAMPLE 1

A series of experiments was carried out to demonstrate the principle of degradation of a polymer by exposure to the vapour of a reactive compound. In each experiment, five pieces of polyamide-6 chips together weighing about 40 mg were introduced into a cylindrical vessel having an internal diameter of 50 mm and an internal height of 40 mm, and the chips were melted and heated to 250° C. at the bottom of the vessel in an atmosphere of nitrogen. When the chips had been melted, superheated steam at 250° C. and a pressure of 1 bar was introduced into the vessel through an aperture in the lid and washed over the molten shavings. After passing over the melt, the steam left the vessel through a second aperture in the lid and was condensed in a condenser for quantitative determination. The chips were prepared from hydrolytically polymerised $\epsilon$-caprolactam and were found by extraction to have a solids content of 10.5%, 8.2% of which consisted of monomeric substances. The extract content was determined gravimetrically in a Soxhlet apparatus after 24 hours' extraction of the chips with methanol. The average molar mass (numerical average) of the chips was about 18,000 kg/kmol, determined after extraction of the methanol soluble oligomers. The quantity of steam passed over the chips in one experiment was between 0.1 and 0.25 kg/h. In the experimental results given in Table 1 below, the gassing time in each experiment is shown in relation to the percentage material loss of the original quantity of sample. It can be seen from the results that a degradation process takes place in the chips over a long period, and the loss of material after 48 hours, for example, amounts to more than half the quantity present at the beginning of the experiment.

Table 1

Material loss of chips treated with gas in dependence upon the gassing time. Steam temperature 250° C.

| Gassing time | 2 | 6.5 | 8 | 19 | 29 | 48 |
|---|---|---|---|---|---|---|
| Material loss of shavings (%) | 12.6 | 15.9 | 20.0 | 33.9 | 37.7 | 52.6 |

EXAMPLE 2

The series of experiments of this example were carried out under the same conditions as in the previous example but the temperature of the superheated steam was in this case 110° C. The results of this series of experiments are summarized in Table 2 in the same way as before. It can be seen that the loss of material by gassing is in all cases less than 20%. If it is considered that half of this loss can be accounted for by the expulsion of readily volatile constituents originally present, the depolymerising action of steam under the conditions of this example is not significant.

Table 2

Material loss of gassed chips in dependence upon the gassing time. Steam temperature 110° C.

| Gassing time (h) | 1 | 8 | 18 | 28 | 40 | 50 |
|---|---|---|---|---|---|---|
| Material loss of shavings (%) | 10.8 | 12.8 | 15.8 | 16.0 | 16.2 | 19.6 |

A comparison of Examples 1 and 2 shows that the depolymerising effect of steam depends substantially on the conditions of the steam and of the chips. Under the experimental conditions of the Examples, it is only at higher steam temperatures that the effect of the reactivity of steam becomes obvious and sufficient for practical application.

EXAMPLE 3

Polyester chips were gassed in a series of experiments, using the same apparatus as described in Example 1. The chips consisted of a polyethylene terephthalate which had an average molecular weight of 11,000 kg/kmol and was suitable for spinning fibrous material. In each experiment, 10 chips of material, together weighing about 180 mg, were introduced into the vessel already described and melted in the bottom of the vessel under an atmosphere of nitrogen and heated to 290° C. When the chips had been melted, the molten material was gassed at atmospheric pressure with steam which has been superheated to 250° C. using the same method of gassing as described in Example 1. The quantity of steam passed over the chips in one experiment was about 0.4 kg/h. Table 3 shows the results of the experiments. The gassing time is shown in each case in relation to the percentage material loss of the original quantity of sample.

Table 3

| Gassing time (h) | 2 | 4 | 5 | 7 |
|---|---|---|---|---|
| Material loss of shavings (%) | 16.3 | 22.7 | 33.6 | 66.7 |

EXAMPLE 4

The same experimental conditions were observed as in Example 3 but steam was in this case passed over the chips at an average rate of 1.5 kg/h. Table 4, shows when compared with Table 3, the more powerful depolymerising effect on the polymer material of the larger quantity of steam.

Table 4

| Gassing time (h) | 2 | 4 | 6 |
|---|---|---|---|
| Material loss of shavings (%) | 24.6 | 43.7 | 64.1 |

EXAMPLE 5

The experimental conditions indicated in Example 3 were observed except that the temperature at which the polyester chips were melted was in this case 250° C.

Table 4 shows the depolymerising effect obtained under these conditions. It is less than that obtained in Example 3 owing to the lower temperature of the melt but still clearly recognisable.

Table 5:

| Gassing time (h) | 3 | 5 | 6 | 7 | 23 |
|---|---|---|---|---|---|
| Material loss of shavings (%) | 2.1 | 3.5 | 4.8 | 7.1 | 24.2 |

EXAMPLE 6

The polyester described in Example 3 was again investigated in the apparatus described in Example 1. The polymer was heated to 250° C. in known manner and the softened chips were gassed at atmospheric pressure with superheated methanol vapour which was at a temperature of 210° C. The quantity of vapour supplied was about 0.3 kg/h. The effect of gassing is indicated in Table 6, in which the gassing time is shown opposite the percentage material loss of polymer. The experimental data obtained show a powerful depolymerising effect of methanol vapour, which is substantially greater than that obtained with steam under otherwise the same conditions.

Table 6:

| Gassing time (h) | 1 | 2 | 3 | 4 | 5 | 6 |
|---|---|---|---|---|---|---|
| Percentage material loss of shavings (%) | 1.6 | 11.6 | 22.3 | 30.7 | 48.6 | 51.9 |

EXAMPLE 7

In addition to the basic experiments described in Examples 1 to 5, test results obtained on nozzle bodies demonstrate the efficiency of the process according to the invention in keeping the nozzle body clean and hence in increasing the operating period of the nozzles.

Figure 4:
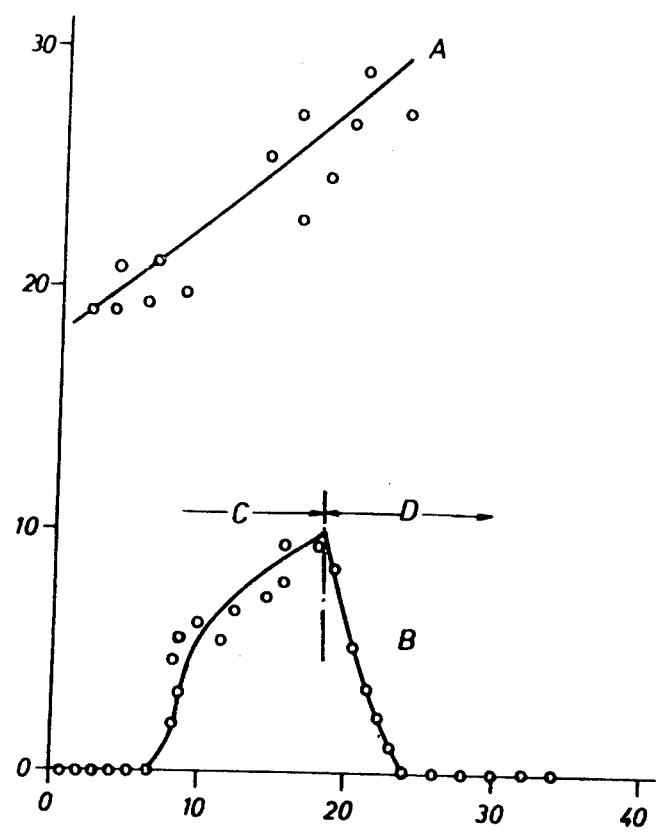

If conventional nozzles used for the extrusion of polyamide melts are not serviced for some considerable time and not gassed, deposits formed from the melt accumulate on the undersurface at the lips of the orifices. After some time, these deposits affect the strand of melt extruded from the nozzle so that melt from the strad is deflected dropwise to the undersurface of the nozzle plate. The number of die orifices which form drops in this way increases from day to day. Curve A of FIG. 4 shows the increase in the number of nozzles which form drops over a period of observation of 16 days. The number of observation days is entered along the abscissa and the percentage proportion of orifices which form drops is entered along the ordinate.

A polyamide-6 melt having the same characteristic material properties as the polymer described in Example 1 was extruded downwards through vertical, cylindrical nozzle orifices 4 mm in diameter at a temperature of 250° C. and at an extrusion rate of 15 kg/h and drawn off at such a rate that the strand of melt had a diameter of about 2 mm when cooled. At the arbitrarily chosen beginning of the period of observation, melt droplets were already forming on 18% of the nozzle orifices under observation. The increase in the number of droplet forming nozzle orifices over a period of observation of 16 days can be read off graph A of FIG. 4, which is drawn as a straight line balancing the coordinate points of the results on either side of it. Under the conditions employed in the example, this increase is found to be about 8%.

Nozzle plates constructed as illustrated in FIG. 3 to provide the possibility of gassing with steam were then used, and the polymer melt mentioned above was extruded under the conditions already described. During the initial period of the experiment, however, extrusion was again carried out without the supply of steam.

As can be seen from Curve B of FIG. 4, which again balances the coordinate points of the results obtained, the lips of the nozzle orifices were still free from drops of melt when the nozzles had been in operation for 6 days. It was only when, on the 18th day of operation of the nozzles, 10% of the nozzle orifices showed droplets, that the ends of the nozzles were gassed with superheated steam at 250° C. and a pressure of 1 bar emitted from the annular gap 5 shown in FIG. 3. The conditions were otherwise the same. The period of time during which no steam was used is indicated at C. During the period D, the nozzle orifices were gassed with steam.

The experimental results represented by Graph B of FIG. 4 confirm that after a short operating time of 6 days, the formation of drops of melt can be prevented by reactive steam.

We claim:

1. Method of keeping nozzle bodies or breaker plates clean during extrusion of polymer which can be shaped from the melt which comprises preventing the formation of deposits near the nozzle orifices by gassing these orifices at the point of extrusion of the melt, said gas consisting entirely or partly of vapours of substances which have a depolymerising action on the deposits formed from the melt at the edge of the die orifice.

2. Method according to claim 1, wherein the gas used for gassing a polycondensate which is being extruded consists entirely or partly of vapour formed from the liquid of the low molecular weight product of the polycondensation reaction corresponding to the polymer.

3. Method according to claim 1, wherein the gas used is mainly steam.

4. Method according to claim 1, wherein traces of highly volatile bases and/or acids are added to the vapours to improve the depolymerising action.

5. Method of keeping nozzle bodies or breaker plates clean during extrusion of polymer which can be shaped from the melt which comprises preventing the formation of deposits on or near the nozzle orifices by washing or cleaning these orifices at the point of extrusion of the melt by means of a stream of gas consisting at least partly of vapours of a material selected from the group consisting of steam, an amine and an alcohol which have a depolymerising action on the deposits normally formed from the melt at the outer edge of the nozzle orifice.

6. The method of claim 5 in which the depolymerising gas is emitted from the nozzle orifices in the same direction and at the same time as the melt.

7. Method according to claim 5, wherein the polymers which are gassed during extrusion are generally polymeric addition and condensation products such as polyesters, polyamides and polyurethanes.

8. Method according to claim 5, wherein before the vapours come into contact with the extruded melt, they are at a temperature above the normal boiling point of the liquid, and they are generally not heated to a temperature more than 100° C. higher than that of the extruded melt.

9. Method according to claim 5, wherein the gas which consists entirely or partly of substances which have a depolymerising effect on the deposits formed from the melt washes the melt on all sides at its exit from the nozzle body and flows down from the nozzle body practically in the same direction as the extruded melt.

10. Method according to claim 5, wherein at its point of contact with the melt, the gas generally flows at a higher average velocity than the melt.

11. Method according to claim 5, wherein the quantitative rate of flow of the vapour from the nozzle body is generally not greater than that of the melt, but is preferably between 0.1 and 10% of that of the melt.

* * * * *